United States Patent
Barger et al.

[11] Patent Number: 5,898,745
[45] Date of Patent: Apr. 27, 1999

[54] NUCLEAR FUEL ASSEMBLY LOCATOR

[75] Inventors: Douglas A. Barger; Anthony A. Pugh, both of Forest, Va.

[73] Assignee: Framatome Technologies, Inc., Lynchburg, Va.

[21] Appl. No.: 08/946,536

[22] Filed: Oct. 7, 1997

[51] Int. Cl.[6] .................................................. G21C 19/00
[52] U.S. Cl. ...................... 376/261; 376/264; 376/268; 376/272
[58] Field of Search ................... 376/261, 264, 376/268–272

[56] References Cited

U.S. PATENT DOCUMENTS

| | | | |
|---|---|---|---|
| 3,603,634 | 9/1971 | Kemph | 294/96 |
| 3,697,375 | 10/1972 | Suvanto et al. | 176/78 |
| 4,053,356 | 10/1977 | Brammer, Jr. | 176/30 |
| 4,635,427 | 1/1987 | Rohr | 53/475 |
| 4,649,017 | 3/1987 | Couture | 376/272 |
| 4,676,945 | 6/1987 | Barkhurst | 376/261 |
| 4,744,940 | 5/1988 | Wachter | 376/261 |
| 5,019,327 | 5/1991 | Fanning et al. | 376/268 |
| 5,068,081 | 11/1991 | Oyama et al. | 376/261 |
| 5,473,645 | 12/1995 | Kowdley | 376/272 |
| 5,661,768 | 8/1997 | Gilligan, III et al. | 376/261 |

OTHER PUBLICATIONS

Master–Lee Engineered Products, Inc.; Article entitled Fuel Assmelby Shoehorn, Undated, Admitted Prior Art.

Primary Examiner—Charles T. Jordan
Assistant Examiner—M. J. Lattig
Attorney, Agent, or Firm—Rhodes Coats & Bennett, L.L.P.

[57] ABSTRACT

A fuel assembly locator for guiding and inserting nuclear fuel assemblies into a grid plate of a reactor vessel during reload. In the preferred embodiment, the fuel assembly locator includes a plurality of generally trapezoidal guides each having a multiplicity of serially increasing tiered slope regions for gradually directing the fuel assembly precisely into a grid plate opening. The increasing slope regions allow greater positional tolerance between the exterior of the fuel assembly and the interior opening of the grid plate opening initially, thus requiring less time and precision to align the fuel assembly with respect to the grid plate opening. The tolerance then gradually decreases since the slope of each successive tier is greater than the previous tier, thus precisely directing the fuel assembly into alignment with the grid plate opening for insertion therein.

37 Claims, 2 Drawing Sheets

5,898,745

NUCLEAR FUEL ASSEMBLY LOCATOR

BACKGROUND OF THE INVENTION

(1) Field of the Invention

The present invention relates generally to nuclear fuel storage systems and, more particularly, to an apparatus for guiding and inserting nuclear fuel assemblies into a reactor vessel or on-site fuel storage pool.

(2) Description of the Prior Art

Nuclear fuel is contained in fuel elements which are formed into fuel assemblies and inserted into a grid plate of a reactor vessel. Fuel handling and loading are conducted with the reactor vessel and fuel-handling pool filled with ambient temperature demineralized water. Typically, the loading process is complex and slow, requiring multiplication measurements for fuel placement, slow fuel insertion, and frequent pauses to relocate sources and monitors. Additionally, the results are checked and rechecked until all fuel assemblies are properly installed into the grid plate of the reactor vessel.

Various prior art fuel assemblies include transfer mechanisms for facilitating the fuel loading operation. Many transfer mechanisms include a conical portion for guiding the fuel assemblies into a position proximate the grid plate opening. The fuel transfer guides of the prior art are cumbersome and do not greatly reduce the time and difficulty associated with fuel assembly loading.

Thus, there remains a need for a fuel assembly locator which is compact and easily repositionable while, at the same time, reduces the time and difficulty associated with fuel assembly loading and greatly reduces the risk of fuel assembly damage during fuel reload.

SUMMARY OF THE INVENTION

The present invention is directed to a fuel assembly locator for guiding and inserting nuclear fuel assemblies into a grid plate of a reactor vessel during reload. In the preferred embodiment, the fuel assembly locator includes a plurality of generally trapezoidal guides each having a multiplicity of serially increasing tiered slope regions for gradually directing the fuel assembly precisely into a grid plate opening. The increasing slope regions allow greater positional tolerance between the exterior of the fuel assembly and the interior opening of the grid plate opening initially, thus requiring less time and precision to align the fuel assembly with respect to the grid plate opening. The tolerance then gradually decreases since the slope of each successive tier is greater than the previous tier, thus precisely directing the fuel assembly into alignment with the grid plate opening for insertion therein.

Preferably, the fuel assembly locator includes at least one generally trapezoidal guide having at least two tiered slope regions for gradually directing the fuel assembly precisely into a grid plate opening.

Also, preferably, the fuel assembly locator includes at least one pair of generally trapezoidal guides each having at least two serially increasing angled sides for gradually directing the fuel assembly precisely into a grid plate opening.

Accordingly, one aspect of the present invention is to provide a fuel assembly locator for guiding the insertion of a nuclear fuel assembly into a grid plate of a reactor vessel for reloading. The apparatus includes: (a) a plurality of generally trapezoidal guides, each of the guides including: (i) a top horizontal surface; (ii) a bottom horizontal surface; and (iii) a tiered slope region fixedly connected to and depending from the top horizontal surface and extending to fixedly connect with the bottom horizontal surface; and (b) transfer means for removably positioning the plurality of generally trapezoidal guides at the perimeter of a grid plate opening for facilitating placement of the nuclear fuel assembly into the grid plate opening.

Another aspect of the present invention is to provide a fuel assembly locator for guiding the insertion of a nuclear fuel assembly into a grid plate of a reactor vessel for reloading. The apparatus includes: (a) a plurality of generally trapezoidal guides, each of the guides including: (i) a top horizontal surface; (ii) a bottom horizontal surface, wherein the bottom horizontal surface of each of the plurality of generally trapezoidal guides further includes support means for removably positioning the guides into the grid plate opening; and (iii) a tiered slope regions fixedly connected to and depending from the top horizontal surface and extending to fixedly connect with the bottom horizontal surface; and (b) transfer means for removably positioning the plurality of generally trapezoidal guides at the perimeter of a grid plate opening for facilitating placement of the nuclear fuel assembly into the grid plate opening.

Still another aspect of the present invention is to provide a fuel assembly locator for guiding the insertion of a nuclear fuel assembly into a grid plate of a reactor vessel for reloading. The apparatus including: (a) a plurality of generally trapezoidal guides, each of the guides including: (i) a top horizontal surface; (ii) a bottom horizontal surface, wherein the bottom horizontal surface of each of the plurality of generally trapezoidal guides further includes support means for removably positioning the guides into the grid plate opening; and (iii) a tiered slope region fixedly connected to and depending from the top horizontal surface and extending to fixedly connect with the bottom horizontal surface, wherein the tiered slope region further includes: a first tier region having a first slope and a first angle; and at least one subsequent tiered region having at least one subsequent slope and at least one subsequent angle, the first tier region proximate the top horizontal surface and the at least one subsequent tiered region extending from the first tier region downwardly and terminating at the bottom horizontal surface, wherein the at least one subsequent slope is greater than the first slope and the at least one subsequent angle is greater than the first angle; and (b) transfer means for removably positioning the plurality of generally trapezoidal guides at the perimeter of a grid plate opening for facilitating placement of the nuclear fuel assembly into the grid plate opening.

These and other aspects of the present invention will become apparent to those skilled in the art after a reading of the following description of the preferred embodiment when considered with the drawings.

DESCRIPTION OF THE PREFERRED EMBODIMENTS

Figure 2:
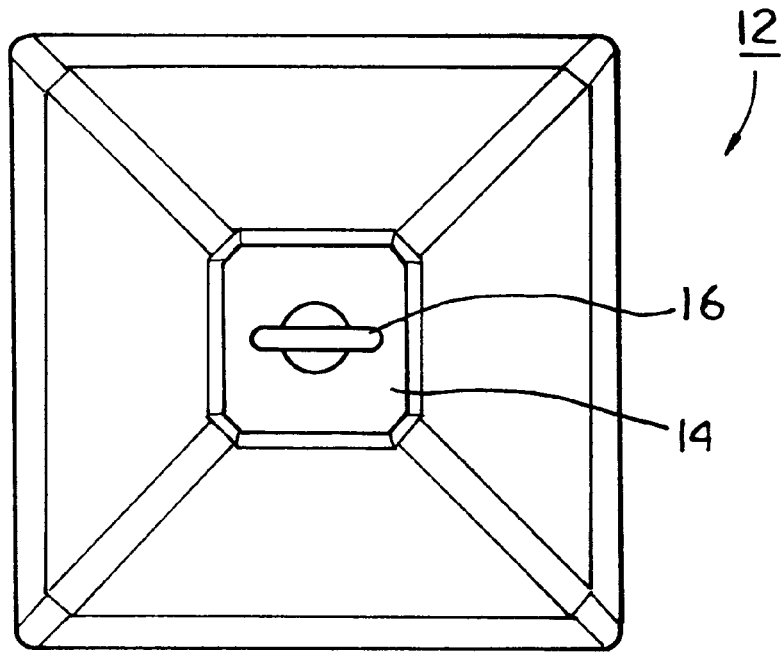
FIG. 2 is a top plan view of the fuel assembly locator shown in FIG. 1.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Figure 1:
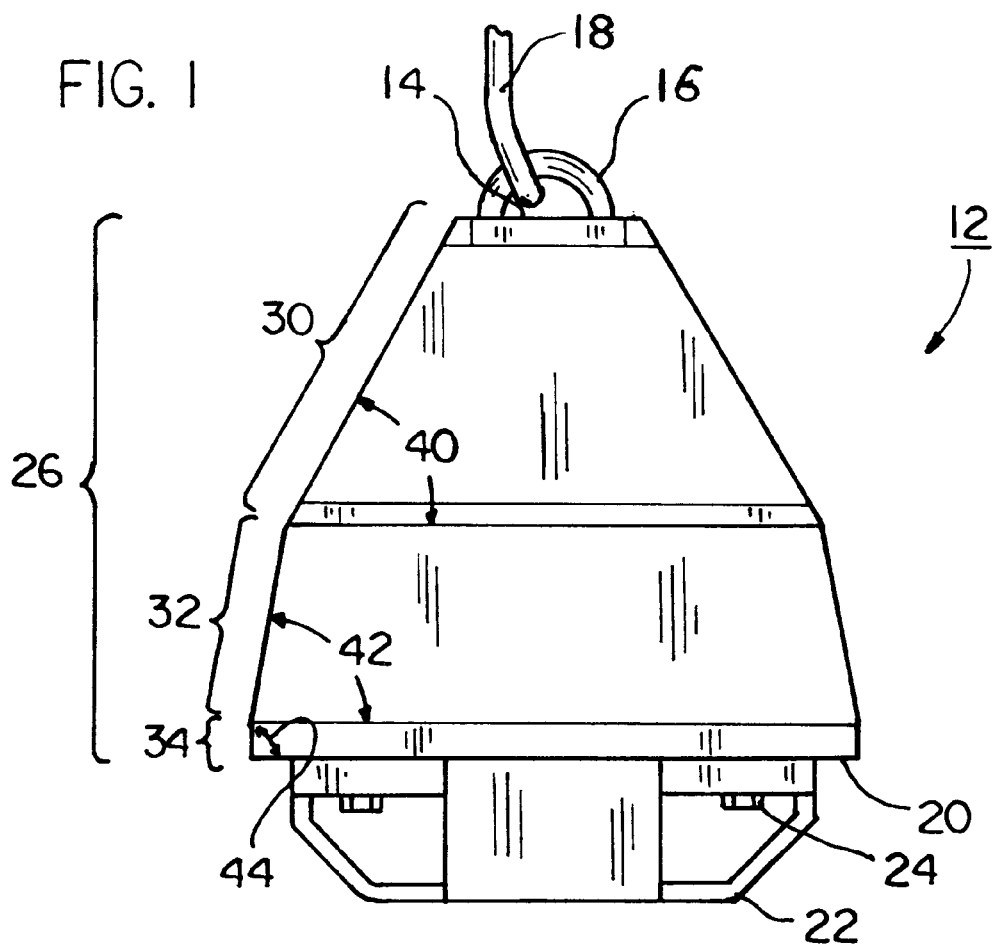
FIG. 1 is a front elevational view of a fuel assembly locator constructed according to the present invention.

Referring now to the drawings in general and FIG. 1 in particular, it will be understood that the illustrations are for the purpose of describing a preferred embodiment of the invention and are not intended to limit the invention thereto. As best seen in FIG. 1, a fuel assembly locator, generally designated 10, is shown constructed according to the present invention.

The fuel assembly locator 10 includes a plurality of generally trapezoidal guides 12, each of the guides having a top horizontal surface 14, a bottom horizontal surface 20, and a multiplicity of tiered slope regions 26 fixedly connected to and depending from the top horizontal surface 14 and extending to fixedly connect with the bottom horizontal surface 20.

The multiplicity of tiered slope regions 26 include a first tier region 30 having a first slope and a first angle 40, and at least one subsequent tiered region 22 having at least one subsequent slope and at least one subsequent angle 42, where the first tier region is located proximate the top horizontal surface 14 and the at least one subsequent tiered region 22 extending from the first tier region 30 downwardly and terminates at the bottom horizontal surface 20.

Further, the at least one subsequent slope is greater than the first slope and the at least one subsequent angle 42 is greater than the first angle 40, thereby providing a funnel-like guide so that the nuclear fuel assembly 50 is first gradually then precisely directed into approximate alignment with the grid space opening 54.

In a preferred embodiment, the at least one subsequent tiered region includes a second tiered region 22 having a second slope and a second angle 42. Preferably, the first angle is between about 15 degrees to 65 degrees; more preferably, the first angle is about 60 degrees. Also, preferably, the second angle 42 is between about 65 degrees to 90 degrees; more preferably, the second angle is about 75 degrees.

Additionally, in a preferred embodiment, each of the generally trapezoidal guides 12, further includes a third tiered region 34 extending from the second tiered region 22 to the bottom horizontal surface 20. The third tiered region 34 having a third slope and a third angle 44, where the third angle is greater than the second angle 42. Preferably, the third angle is about 90 degrees.

The angles are defined by the slope of the tiered regions and the horizontal axis of the trapezoidal guide. By way of example, a first angle 40 is defined by the outside edge of the first tier region 30 and the horizontal surface of the first tier region. Angles 42 and 44 are similarly defined. The slopes are defined as the outside edges of the tier regions. The terms "tiered slope region" and "tiered region" are defined as region or regions of the locator assembly which have changing slopes one above the other.

As shown in FIGS. 1 and 2, each of the plurality of generally trapezoidal guides 12 further include transfer means for removably positioning the guides along the grid plate opening. The transfer means includes a protrusion 16 fixedly positioned on the top horizontal surface 14. The protrusion 16 may be a handle, a hook, or other configured member for providing a location for gripping or attaching a transfer extension 18, and is constructed to receive a cable or chain for facilitating transfer via remote controlling mechanism. Alternatively, the top horizontal surface 14 may be a magnetic surface, thereby enabling lifting and transfer of the guide 12 without requiring attachment of a transfer extension 18.

Also, in a preferred embodiment, each of the plurality of generally trapezoidal guides 12 further include a support means for removably positioning the guides 12 along the grid plate opening 54. Preferably, the support means are a plurality of support legs 22 removably secured by fasteners 24 to the bottom horizontal surface 20. More preferably, the fasteners 24 include a plurality of bolts and screws, respectively connected. Alternatively, the support means may be fixedly secured to the bottom horizontal surface via welding, or an adhesive.

Further, in a preferred embodiment, each of the plurality of generally trapezoidal guides are weighted to retain position. More preferably, each of the plurality of generally trapezoidal guides are constructed and appropriately weighted to about 35 pounds each. The guides 12 may be constructed of metal, plastic, and combinations thereof.

Figure 3:
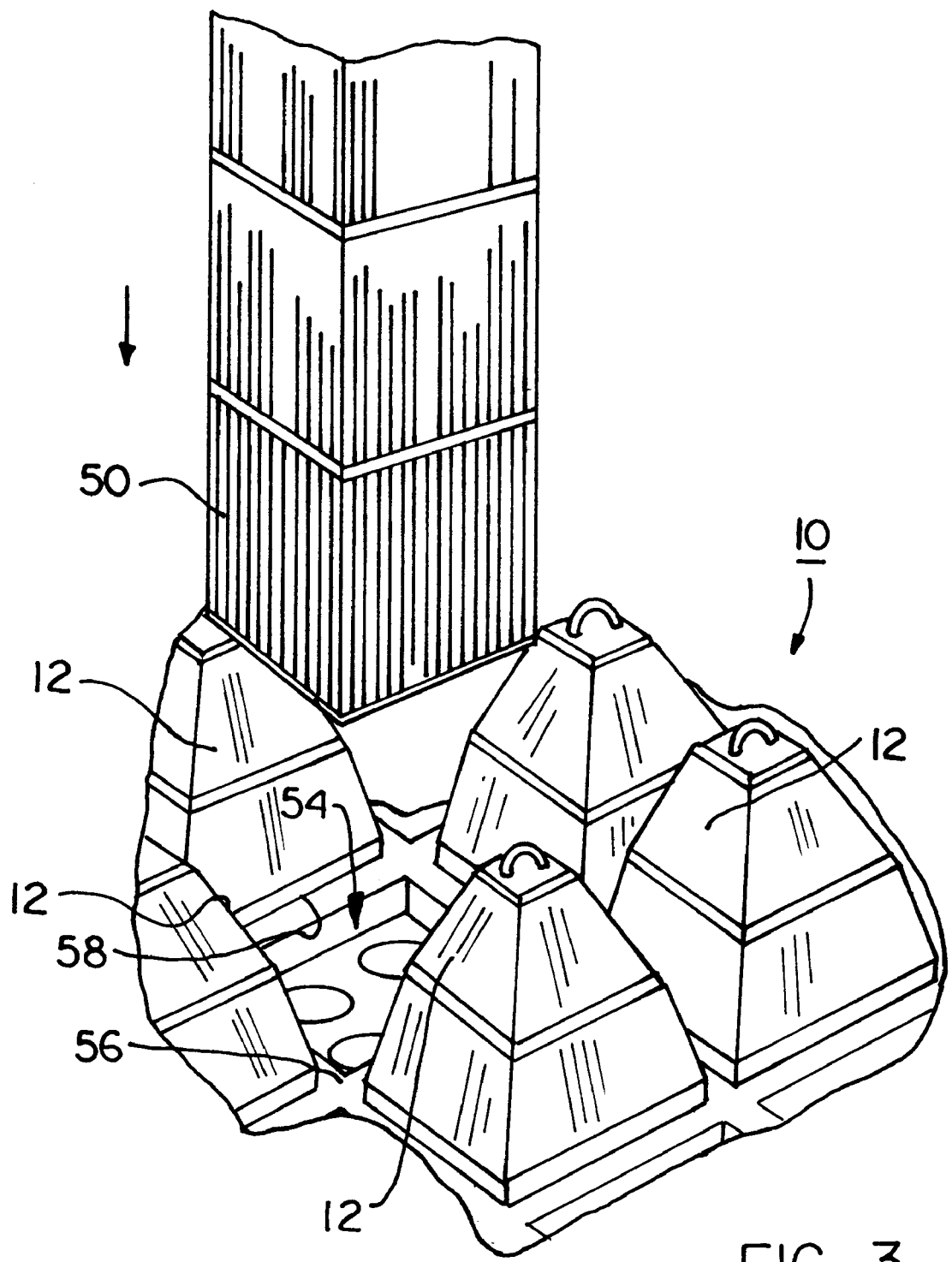
FIG. 3 is a perspective view of the fuel assembly locator according to the present invention.

As best seen in FIG. 3, the fuel assembly locator 10 functions to guide and facilitate insertion of nuclear fuel assemblies 50 into a grid plate opening 54 for reloading within the grid plate 52 of a reactor vessel (not shown).

The plurality of generally trapezoidal guides 12 are lifted via respective transfer means 16 and are removably deposited at spaced apart positions along the grid plate opening 54. Preferably, the guides 12 are removably positioned at the perimeter 58 of the grid plate opening 54 for facilitating placement of the nuclear fuel assembly 50 therein. More preferably, the plurality of generally trapezoidal guides 12 includes at least one pair of guides, more preferably two pair of guides, positioned at corners 56 of the grid plate opening 54.

Next, a nuclear fuel assembly 50 is provided above the grid plate opening 54 and between the plurality of guides 12. The nuclear element is then lowered, and horizontally shifted to a position of approximate axial alignment with the grid plate opening 54 and between the plurality of guides 12. The multiplicity of tiered slope regions 26 of each of the guides 12 first gradually and then precisely direct the nuclear fuel assembly 50 into the grid plate opening 54 for reloading.

As can be seen, the angles and relationship of the first and subsequent tiered slope regions are important characteristics of the instant invention. The fuel assembly locator allows for fuel handling bridges to off index enough so that the fuel assembly has a free path vertically into the core but will seat into the core plate when fully lowered thus greatly reducing the risk of fuel assembly damage during the reload.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. A fuel assembly locator for guiding the insertion of a nuclear fuel assembly into a grid plate of a reactor vessel for reloading, said apparatus comprising:

(a) a plurality of generally trapezoidal guides, each of said guides including: (i) a top horizontal surface; (ii) a bottom horizontal surface; and (iii) a tiered slope region fixedly connected to and depending from said top horizontal surface and extending to fixedly connect with said bottom horizontal surface wherein said tiered slope region further includes: a first tier region having a first slope and a first angle, said first tier region proximate said top horizontal surface, a second tiered region extending from said first tier region downwardly having a second slope and a second angle, said second angle being between about 65 degrees to 90 degrees, wherein said second slope is greater than said first slope and said at least second angle is greater than said first angle: a third tiered region extending from said second tiered region, said third tiered region having a third slope and a third angle, said third angle being greater than said second angle and being about 90 degrees; and (b) transfer means for removably positioning said plurality of generally trapezoidal guides at the perimeter of a grid plate opening for facilitating placement of said nuclear fuel assembly into said grid plate opening.

2. The apparatus according to claim 1, wherein the first angle is between about 15 degrees to 65 degrees.

3. The apparatus according to claim 2, wherein the first angle is about 60 degrees.

4. The apparatus according to claim 1, wherein the second angle is about 75 degrees.

5. The apparatus according to claim 1, wherein the plurality of generally trapezoidal guides includes a pair of guides.

6. The apparatus according to claim 1, wherein the plurality of generally trapezoidal guides includes two pair of guides positioned at corners of the grid plate opening.

7. The apparatus according to claim 1, wherein said transfer means for removably positioning the guides at the perimeter of a grid plate opening for facilitating placement of said nuclear fuel assembly into said grid plate opening includes a protrusion fixedly positioned on the top horizontal surface.

8. The apparatus according to claim 7, wherein the protrusion is a handle.

9. The apparatus according to claim 7, wherein the protrusion is a hook.

10. The apparatus according to claim 7, wherein said transfer means further comprises a magnetic surface.

11. A fuel assembly locator for guiding the insertion of a nuclear fuel assembly into a grid plate of a reactor vessel for reloading, said apparatus comprising:

(a) a plurality of generally trapezoidal guides, each of said guides including: (i) a top horizontal surface; (ii) a bottom horizontal surface, wherein said bottom horizontal surface of each of said plurality of generally trapezoidal guides further includes support means having support legs removably secured to the bottom horizontal surface for removably positioning the guides into the grid plate opening; and (iii) a tiered slope regions fixedly connected to and depending from said top horizontal surface and extending to fixedly connect with said bottom horizontal surface; and (b) transfer means for removably positioning said plurality of generally trapezoidal guides at the perimeter of a grid plate opening for facilitating placement of said nuclear fuel assembly into said grid plate opening.

12. The apparatus according to claim 11, wherein the support legs are removably secured by fastener means.

13. The apparatus according to claim 12, the fastener means are a plurality of bolts and threaded apertures, respectively connected.

14. The apparatus according to claim 11, wherein each of said plurality of generally trapezoidal guides are weighted to retain position.

15. The apparatus according to claim 14, wherein each of said plurality of generally trapezoidal guides are weighted to about 35 pounds.

16. The apparatus according to claim 11, wherein the guides are formed from metal.

17. The apparatus according to claim 11, wherein the guides are formed from plastic.

18. A fuel assembly locator for guiding the insertion of a nuclear fuel assembly into a grid plate of a reactor vessel for reloading, said apparatus comprising:

(a) a plurality of generally trapezoidal guides, each of said guides including: (i) a top horizontal surface; (ii) a bottom horizontal surface, wherein said bottom horizontal surface of each of said plurality of generally trapezoidal guides further includes support means having support legs removably secured to the bottom horizontal surface for removably positioning the guides into the grid plate opening; and (iii) a tiered slope region fixedly connected to and depending from said top horizontal surface and extending to fixedly connect with said bottom horizontal surface, wherein said tiered slope region further includes: a first tier region having a first slope and a first angle; and at least one subsequent tiered region having at least one subsequent slope and at least one subsequent angle, said first tier region proximate said top horizontal surface and said at least one subsequent tiered region extending from said first tier region downwardly and terminating at said bottom horizontal surface, wherein said at least one subsequent slope is greater than said first slope and said at least one subsequent angle is greater than said first angle; and (b) transfer means for removably positioning said plurality of generally trapezoidal guides at the perimeter of a grid plate opening for facilitating placement of said nuclear fuel assembly into said grid plate opening.

19. The apparatus according to claim 18, wherein the first angle is between about 15 degrees to 65 degrees.

20. The apparatus according to claim 19, wherein the first angle is about 60 degrees.

21. The apparatus according to claim 18, wherein said at least one subsequent tiered region includes a second tiered region having a second slope and a second angle, said second angle being between about 65 degrees to 90 degrees.

22. The apparatus according to claim 21, wherein the second angle is about 75 degrees.

23. The apparatus according to claim 21, wherein said at least one subsequent tiered region further includes a third tiered region extending from said second tiered region to said bottom horizontal surface, said third tiered region having a third slope and a third angle, said third angle being greater than said second angle.

24. The apparatus according to claim 23, wherein the third angle is about 90 degrees.

25. The apparatus according to claim 18, wherein the plurality of generally trapezoidal guides includes a pair of guides.

26. The apparatus according to claim 18, wherein the plurality of generally trapezoidal guides includes two pair of guides positioned at corners of the grid plate opening.

27. The apparatus according to claim 18, wherein said transfer means for removably positioning the guides at the perimeter of a grid plate opening for facilitating placement of said nuclear fuel assembly into said grid plate opening includes a protrusion fixedly positioned on the top horizontal surface.

28. The apparatus according to claim 27, wherein the protrusion is a handle.

29. The apparatus according to claim 27, wherein the protrusion is a hook.

30. The apparatus according to claim 27, wherein said transfer means further comprises a magnetic surface.

31. The apparatus according to claim 18, wherein the support legs are removably secured by fastener means.

32. The apparatus according to claim 31, the fastener means are a plurality of bolts and threaded apertures, respectively connected.

33. The apparatus according to claim 18, wherein each of said plurality of generally trapezoidal guides are weighted to retain position.

34. The apparatus according to claim 33, wherein each of said plurality of generally trapezoidal guides are weighted to about 35 pounds.

35. The apparatus according to claim 18, wherein the guides are formed from metal.

36. The apparatus according to claim 18, wherein the guides are formed from plastic.

37. A method for inserting nuclear fuel assemblies into a grid plate of a reactor vessel for reloading, said method comprising the steps of:

(a) providing a fuel assembly locator including a plurality of generally trapezoidal guides, each of said guides including: (i) a top horizontal surface; (ii) a bottom horizontal surface; and (iii) a tiered slope region fixedly connected to and depending from said top horizontal surface and extending to fixedly connect with said bottom horizontal surface;

(b) placing each of the plurality of generally trapezoidal guides into adjacent openings surrounding the opening in said grid plated where said nuclear fuel assembly is to be placed;

(c) positioning said nuclear fuel assembly above said grid plate opening and between said plurality of guides;

(d) lowering said nuclear fuel assembly into the opening between said plurality of guides into said grid plate, whereby said fuel assembly locator allows for the fuel handling bridges to off index enough so that the fuel assembly has a free path vertically into the core but will seat into the core plate when fully lowered thus greatly reducing the risk of fuel assembly damage during the reload.

* * * * *